July 8, 1941.   A. L. MacCLAIN   2,248,245
ENGINE TORQUE REGULATING DEVICE
Filed Nov. 16, 1939   3 Sheets-Sheet 1

INVENTOR
*Albert Lewis MacClain*
BY
*Harris G. Luther*
ATTORNEY

July 8, 1941.  A. L. MacCLAIN  2,248,245
ENGINE TORQUE REGULATING DEVICE
Filed Nov. 16, 1939  3 Sheets-Sheet 2

INVENTOR
Albert Lewis MacClain
BY
Harris G. Luther
ATTORNEY

July 8, 1941.  A. L. MacCLAIN  2,248,245
ENGINE TORQUE REGULATING DEVICE
Filed Nov. 16, 1939   3 Sheets-Sheet 3

INVENTOR
Albert Lewis MacClain
BY
Harris G. Luther
ATTORNEY

Patented July 8, 1941

2,248,245

UNITED STATES PATENT OFFICE 2,248,245

ENGINE TORQUE REGULATING DEVICE

Albert Lewis MacClain, West Hartford, Conn., assignor to United Aircraft Corporation, East Hartford, Conn., a corporation of Delaware Application November 16, 1939, Serial No. 304,869

14 Claims. (Cl. 123—103)

This invention relates to improvements in engine torque regulating devices and has particular reference to an improved torque regulating device for a manually controlled vehicle engine such as an aircraft engine.

An object of the invention resides in the provision of an improved torque regulating device of the character specified which will automatically maintain the engine torque at a preselected value for a desired period of operation.

A further object resides in the provision of a torque regulating device of the character indicated which is manually adjustable so that the torque value automatically maintained by the device may be selected by the operator during operation of the engine.

A still further object resides in the provision of an automatic torque regulator of the character specified which may be overridden by the manual controls if desired so that the engine may be manually operated in the conventional manner by the exercise of additional force on the part of the operator and will be returned to the automatic control when the use of the required additional force is discontinued.

An additional object resides in the provision of an automatic torque indicator of the character specified which may be rendered inoperative at any time by the operator so that the operation of the engine will be restored to the conventional manual control.

Yet another object resides in the provision of an automatic torque regulator of the character specified which is effective at all times at which it is operative to prevent the engine from exceeding a preselected maximum torque.

It is also among the objects of the invention to provide an automatic torque regulator of the character indicated which may be applied to a conventional engine and its controls without necessitating any drastic changes in the engine or in the construction and arrangement of the engine controls.

Other objects and advantages will be more particularly pointed out hereinafter or will become apparent as the description proceeds.

In the accompanying drawings, in which like reference numerals are used to designate similar parts throughout, there is diagrammatically illustrated a suitable constructional arrangement for the purpose of disclosing the invention. The drawings, however, are for the purpose of illustration only and are not to be taken as limiting or restricting the scope of the invention as it will be apparent to those skilled in the art that various changes in the illustrated embodiment may be resorted to without in any way exceeding the scope of the invention.

Figure 1:
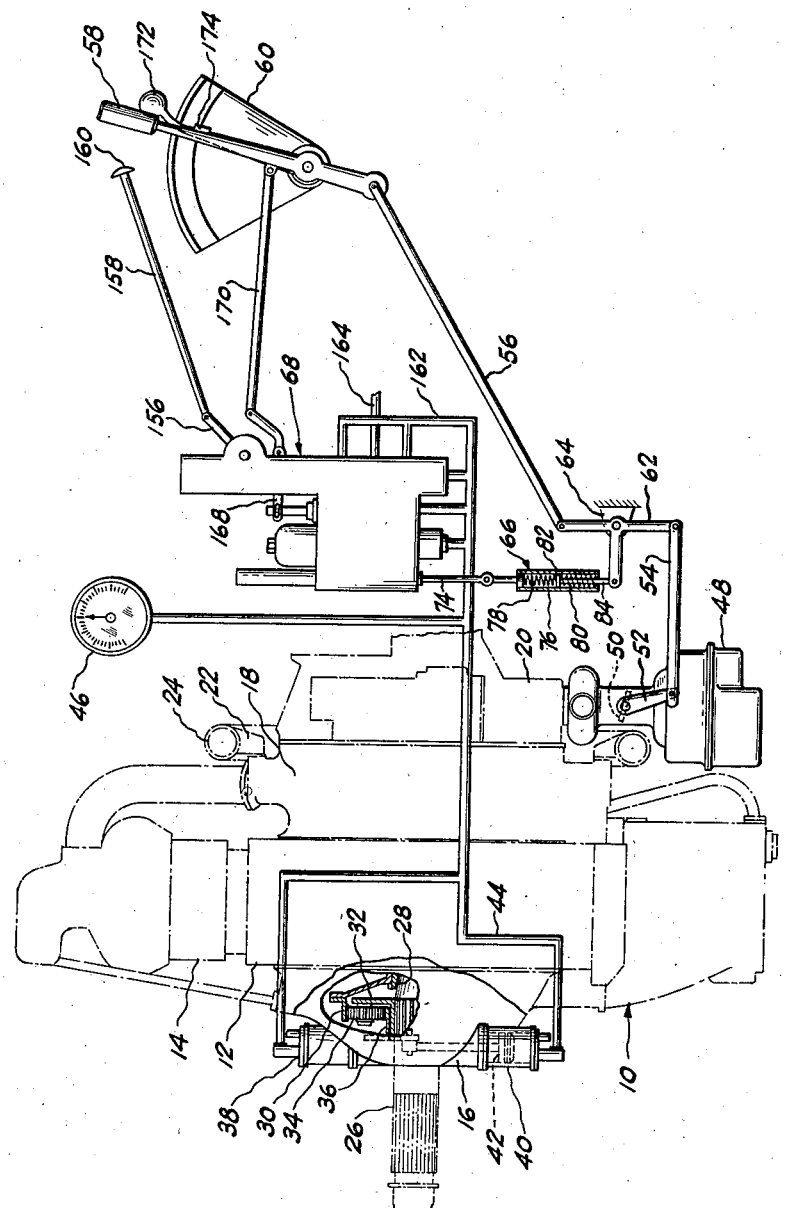
Fig. 1 is a somewhat diagrammatic illustration of an aircraft engine and engine control instrumentalities showing the application thereto of an automatic torque regulating device constructed according to the invention.

Referring to the drawings in detail, the numeral 10 generally indicates an engine which may be an internal combustion engine such as a radial aircooled engine ordinarily employed for the propulsion of aircraft although the invention is in no way limited in its application to any particular form or type of engine. Such an engine may have a crankcase portion 12 around or along which are arranged a plurality of cylinders 14 and to which are secured the nose section 16, the blower section 18 and the accessory section 20. Such an engine may be secured to the vehicle for which it supplies the motive power by any suitable or conventional means, such as the brackets 22 attached to the mounting ring 24 which is in turn attached to the vehicle by suitable frame elements not illustrated. In the conventional arrangement, the propeller shaft 26 projects from the nosepiece 16 to carry an aeronautical propeller, not illustrated, and is connected to the engine crankshaft 28 by a suitable speed change gear such as the planetary reduction gear illustrated. Such a reduction gear may include an external annular gear 30 drivingly connected to the crankshaft, a rotatable cage 32 drivingly connected to the propeller shaft and carrying planet gears, as indicated at 34, which mesh with the internal gear teeth of the annular drive gear 30 and with the external gear teeth of a relatively fixed sun gear or reaction gear element 36. As the reaction resisting free rotation of the planet gears 34 is taken by the fixed gear element 36 it will be apparent to those skilled in the art that the force required to restrain this fixed gear element from rotation is a direct measure at all times of the torque developed by the engine. In the illustrated arrangement the force necessary to restrain the fixed gear element 36 against rotation is imparted to a hydraulic torque indicating device certain forms of which are well known to the prior art. Such a device may comprise one or more fixed cylinders as indicated at 38 and 40 secured to or formed integrally with the engine nosepiece 16, and receiving respective pistons, as indicated at 42 and 43, secured by suitable link and arm elements to the gear 36. For a more detailed description of a suitable torque indicating device reference may be had to Patent Number 2,154,489, issued April 18, 1939, to Richard S. Buck, for Vibration damper. Hydraulic fluid is supplied to the spaces between the pistons and the closed outer ends of the cylinders 38 and 40 through the supply line 41 and these spaces may be connected by suitable fluid conduits, as indicated at 44, with a pressure gauge 46 which may be calibrated in pressure units, or may be calibrated directly in torque units if so desired.

The engine is provided with a carburetor 48, or other fuel or energy supplying device, having a throttle valve 50 operated by a lever 52 connected by links 54 and 56 to a manually controllable throttle lever 58 pivotally mounted on the throttle bracket 60. At their adjoining ends the links 54 and 56 are pivotally connected to opposite arms of a three arm lever 62 which is pivotally connected intermediate its length to a fixed bracket 64 and has its other leg connected through a flexible connection, generally indicated at 66, with the automatic torque regulating device, generally indicated at 68.

Figure 2:
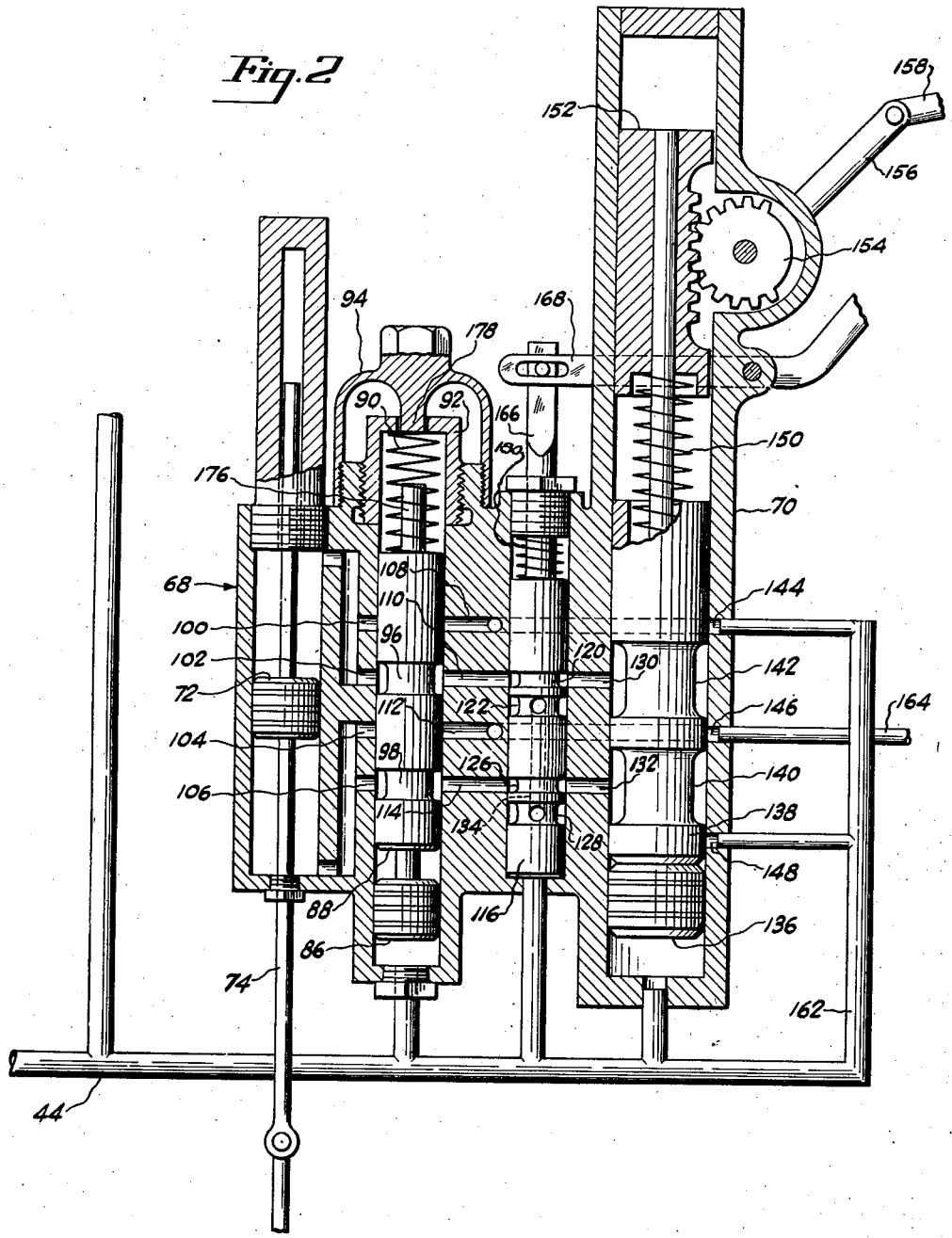
Fig. 2 is a sectional view on an enlarged scale of the torque regulator shown in Fig. 1.
Figure 4:
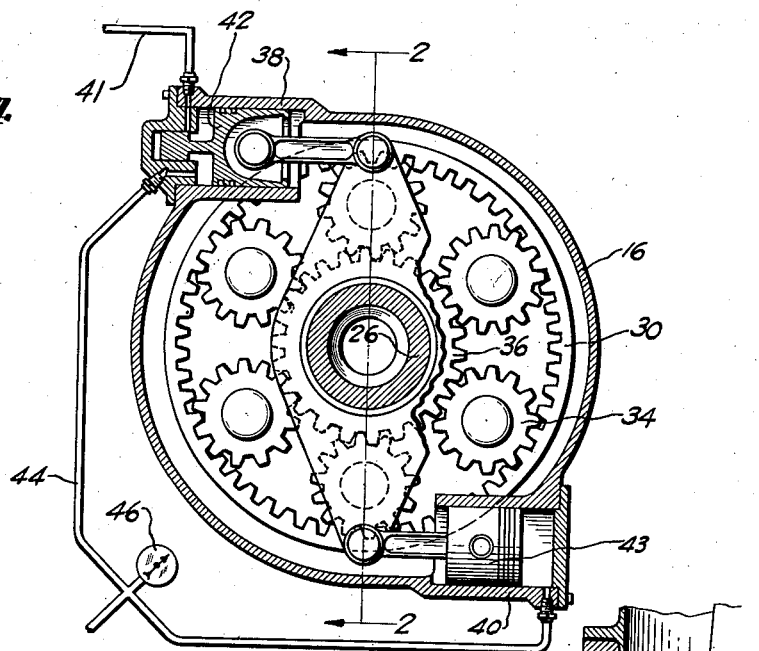
Fig. 4 is a transverse sectional view taken on the line 4—4 of Fig. 3.
Figure 3:
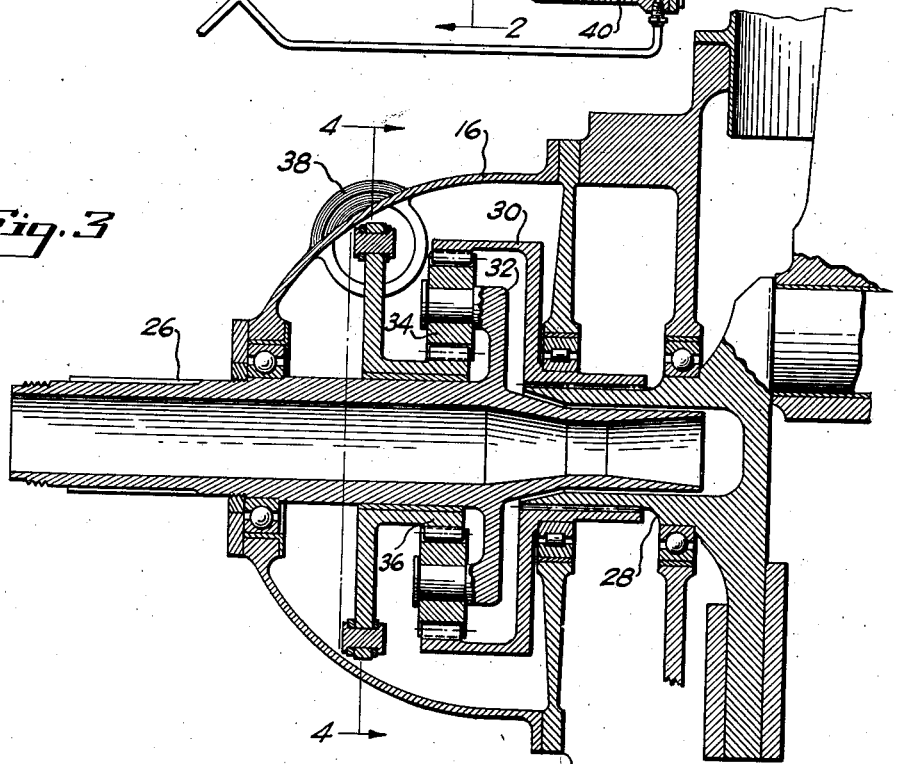
Fig. 3 is a longitudinal sectional view on an enlarged scale of the engine nose section and torque meter schematically shown in Fig. 1.

The torque regulating device 68 as is more particularly shown in Fig. 2, may conveniently comprise a casing 70 having four parallel cylindrical cavities therein within which are disposed reciprocable pistons and valve elements as will presently appear. In the arrangement illustrated the left hand cylinder contains a piston 72 which is connected by the rod 74 to the lost motion device 66. This lost motion device may conveniently comprise a cylinder 76 within which are disposed a pair of opposed springs 78 and 80 between the adjoining ends of which is located an abutment 82 connected to the bell crank 62 by the link 84. This arrangement is such that the movements of the piston 72 will ordinarily move the bell crank lever 62 and link 54 to change the setting of the engine throttle valve 50 but will permit movements of the throttle valve by the manual control lever 58 without a corresponding movement of the piston 72 if sufficient force is supplied to the lever 58. By this arrangement the pilot may override the automatic control but will be informed by the appreciable force necessary to compress the spring that the torque for which the control device is set is being exceeded. The second cylinder from the left, in the arrangement illustrated, is hydraulically connected at its lower end to an extension of the conduit 44 and contains a piston 86 connected to a valve plunger 88. The valve plunger 88 is resiliently urged to its lowermost position by the spring 90 which is held under compression by the adjustable cap 92 covered and protected by the removable closure member 94. The plunger 88 is provided with spaced annular grooves 96 and 98 which are arranged to cooperate with the ports 100, 102, 104 and 106 on the left hand side of its cylinder and with the ports 108, 110, 112 and 114 on the right hand side of the cylinder in a manner which will presently appear. The next cylinder to the right contains a valve plunger 116 provided with annular grooves 120, 122, 126 and 128 spaced apart by cylindrical pistons or valve gages, which grooves cooperate with the ports 110, and 114 on the left hand side of the valve cylinder and with ports 130 and 132 on the right hand side of the cylinder. The grooves 122 and 128 are connected together by a channel 134 extending through a portion of the interior of the valve plunger. The right hand cylinder contains a piston 136 connected to a valve plunger 138 having elongated annular grooves 140 and 142 separated by a cylindrical valve piston or gate, and terminated at their opposite ends by similar pistons or valve gates. These grooves cooperate with the ports 130 and 132 and with the ports 144, 146 and 148 in a manner which will also presently appear. The conduit 44 is hydraulically connected to the bottom of the right hand cylinder below the piston 136 and the valve plunger 138 and piston 136 are resiliently urged downwardly against the force of the hydraulic fluid by a spring 150 compressed by a movable abutment 152 slidably mounted in the upper end of the valve cylinder and controlled by a suitable device such as the pinion 154 which carries teeth meshing with rack teeth on the abutment 152 and is rotatable by an arm or pulley 156 connected through a suitable link or cable 158 to a manual control element 160 so that, by operation of the control 160 the load on the spring 150 may be adjusted as desired. The ports 108, 144 and 148 are hydraulically connected with the conduit 44 by the branch conduit 162, or with some other suitable source of hydraulic fluid under pressure and the ports 112 and 146 are connected with a drain conduit 164.

The valve plunger 116 has an upwardly projecting stem 166 which projects out of the casing 68 and is pivotally connected at its upper end to one leg of a bell crank lever 168, pivotally mounted intermediate its length on the casing 70 and connected at its opposite end through a link 170 with a manual control lever 172 which carries an abutment 174 which engages the throttle lever 58 when that lever is moved to a throttle closing position for a purpose which will presently appear.

The adjustment and operation of the device is substantially as follows:

The cap 92 is first adjusted to compress the spring 90 to a condition such that the valve plunger 88 will rise against the force of the spring under the force of the pressure of the hydraulic fluid applied to the bottom of the piston 86 when the engine develops the maximum torque which is to be permitted under any circumstances. When this valve plunger rises to its uppermost position, which may be limited by contact of the upper end of the stem 176 with the lower end of the plug 178 formed in the cover 94, it acts to block the ports 102 and 106, connect the port 100 with the port 108 connected to the pressure line 162 and connect the port 104 with the port 112 connected to the drain channel 146. The spring 90 may be so selected that it permits only slight movement of the member 88 before the maximum permissible torque value is reached. Under these conditions, as the hydraulic fluid is drained from below the piston 72, hydraulic fluid under pressure will be admitted to the space above the piston from the port 108 to force the piston downwardly and thereby move the bell crank lever 62 to close the throttle valve 50. If the throttle closing action of the piston under these conditions is opposed by the manual control, the piston may be forced downwardly until the spring 80 becomes solid and the device acts as a positive stop for the manual throttle control. While the maximum permissible torque is thus automatically limited to avoid injury to the engine, the engine may be caused to operate at any desired torque below this maximum value by manual adjustment of the movable abutment 152 through the operative mechanism including the gear 154, lever 156, link 158 and knob 160. The knob, schematically illustrated at 160, may obviously be some form of lever or dial and may cooperate with a scale provided in torque units so that, when the torque regulator is calibrated to the particular engine, the desired operating torque may be readily selected by simply moving the element 160 to the proper position as indicated by the scale. When the abutment 152 has been set for the desired engine torque the plunger 138 will stay in the balanced position illustrated as long as the engine is operating at the desired torque value. Assuming that the engine torque exceeds the desired value, but is still under the maximum allowable torque so that the valve 88 is not operative, the pressure of the hydraulic fluid below the piston 136 will force the plunger 138 upwardly to connect the port 144 with the port 130, and the port 132 with the drain port 146. When this occurs hydraulic fluid under pressure will flow from the port 144 through the groove 142 into the port 130, through the groove 120, port 110, groove 96, and port 102 to the space above the piston 72 to force the piston 72 downwardly to close the throttle valve 50. At the same time the fluid from the space below the piston 72 will flow through the port 106, groove 98, port 114, groove 126, port 132, groove 140 and port 146 to the drain conduit 164 as the downward movement of the piston displaces the fluid in the lower end of its cylinder. If the engine torque is below that selected, the spring 150 will force the plunger 138 downwardly against the pressure of the hydraulic fluid acting on the cylinder 136, in which case hydraulic fluid will flow from the pressure port 148 through the groove 140, the port 132, the groove 126, the port 114, the groove 98 and the port 106 to the space below the piston 72 forcing the piston upwardly to open the throttle valve 50. At the same time hydraulic fluid displaced by upward movement of the piston 72 from the upper end of its cylinder will flow through the port 102, groove 96, the port 110, the groove 120, the port 130, the groove 142 and the port 146 to the drain conduit 164. When the engine torque corresponds to that for which the automatic torque regulator is set the plunger 138 assumes the neutral position illustrated in which it blocks the drain port 146 and the pressure ports 144 and 148 so that no fluid can enter or leave the spaces at each side of the piston 72. Thus the piston will be held in the position to maintain the throttle setting consistent with the desired torque.

At various times it may be desirable to disconnect the automatic torque regulator and restore the engine to manual control. This can be done by moving the control lever 172 to the right, as illustrated, to lift the valve plunger 116 against the force of the spring 180. If desired, a suitable latch may be provided on the bracket 60 to retain the lever 172 in position to maintain the plunger 116 in the raised position indicated. When the plunger 116 is so raised the port 110 will be connected with the port 114 through the grooves 122 and 128 and the internal channel 134. At the same time the ports 108 and 112 will be directly connected respectively with the pressure port 144 and the drain port 146 so that fluid under pressure may be applied to the upper end of piston 72 in the event valve 88 rises incident to the engine torque tending to exceed the maximum safe limit. As long as the valve 88 remains in its upper position connecting the ports 110 and 114 together, hydraulic fluid may flow freely from the space at one side of the piston 72 to the space at the opposite side as the piston is moved to displace fluid from one end of the cylinder or the other. This same upward movement of the valve plunger 116 may either block the ports 130 and 132 depending on the shape of the grooves 122 and 128 or may connect them together in such a manner that the plunger 138 is rendered inoperative to control the application of pressure and drain to the piston 72. If the ports are blocked the valve 138 will be hydraulically disconnected from the remainder of the apparatus and, if they are connected, hydraulic fluid admitted through one groove of the plunger 138 will merely be returned to drain through the other groove.

In order that the engine may be permitted to idle without the necessity of manually changing the automatic torque regulator to a minimum torque condition or independently rendering the regulator inoperative whenever the throttle 58 is moved to the engine idling position, the lug 174 is provided so that the throttle lever 58 will pick up the control lever 172 whenever the throttle is moved to the idling position thereby automatically disconnecting the automatic regulator and permitting the engine to idle rather than maintain the torque at the value at which the regulator happens to be set.

While in the illustrated embodiment the torque regulator has been shown as adapted for use with a hydraulic torque indicating device, it will be apparent to those skilled in the art that various other arrangements may be utilized without in any way exceeding the scope of the invention. For example, since the engine manifold pressure is substantially directly proportional to the power output of the engine, a device similar to that illustrated may be arranged to operate on intake manifold pressure variations to limit the power of the engine to a predetermined maximum value or automatically maintain the engine power at some selected value.

In the arrangement illustrated the engine torque is balanced at all times at which the automatic torque regulator is operative against a spring which may be so manufactured and calibrated as to have a constant rate. Thus the device, while light in weight and simple in arrangement, provides an accurate control for the engine torque and, in the case of an airplane, relieves the pilot from the duty of making manual adjustments to maintain the engine at the desired torque output. By simply setting the torque regulator for the operation desired such as take-off, climb or cruising operations, the engine will be automatically maintained at the proper torque output for that particular operation and the pilot may devote his attention to other duties. If desired, the fluid inlet below the piston 136 may be restricted to provide a damping action on the piston and thus eliminate any tendency of the device to "hunt."

While a particular mechanical embodiment has been somewhat diagrammatically illustrated for the purpose of disclosing the invention, it is to be understood that the invention is not limited to the arrangement so illustrated and described, but that such changes in the size and arrangements of the various parts and in the manner of operation may be resorted to as come within the scope of the appended claims.

Having now described the invention so that others skilled in the art may clearly understand the same, what it is desired to secure by Letters Patent is as follows:

1. An engine torque regulator comprising, a reversible motor adapted to move an engine power controlling instrumentality, means responsive to the torque developed by said engine for controlling said reversible motor, means operatively associated with said motor controlling means manually adjustable to a selected torque setting to render said torque control operative to maintain the engine torque constant at a selected value, and automatic means also responsive to the torque developed by said engine acting independently of said first mentioned torque responsive means to control said motor to limit the maximum torque developed by said engine to a preselected value.

2. An engine torque regulator comprising, a reversible motor for operating an engine power control, manually adjustable means responsive to the torque developed by said engine for controlling the action of said motor, a maximum torque limiting means responsive to the torque developed by said engine and operative independently of said manually adjustable means for controlling the action of said motor to prevent the engine torque from exceeding a preselected maximum value, and manually actuatable means for disabling said manually adjustable means to render said engine power control subject to manual actuation.

3. In combination with an engine having a power control and manually actuatable means for operating said power control, a manually adjustable torque regulator for automatically maintaining the torque developed by said engine constant at a selected value, and a resilient connection between said automatic torque regulator and said engine power control to render said power control operable by said manually actuatable means independently of the action of said automatic means.

4. In combination with an engine having a power control and manually actuatable means for operating said power control, a manually adjustable torque regulator for automatically maintaining the torque developed by said engine constant at a selected value, manually operable means for rendering said automatic means ineffective to control the torque developed by said engine, and a connection between said manually operable power control means and said manually operable means for rendering said automatic regulator ineffective whenever said manual power control is moved to a position consistent with idling operations of said engine.

5. An automatic torque regulator for an engine having an adjustable power regulating fuel control comprising a reversible hydraulic motor operatively connected with said fuel control, a valve responsive to the torque developed by said engine effective to control the operation of said motor, resilient means opposing movements of said valve in one direction, and manually adjustable means for changing the loading on said resilient means to vary the torque value maintained constant by said automatic torque regulator.

6. In combination with an engine having a fuel control for regulating engine power, fluid containing means in which the fluid pressure varies directly with the torque developed by said engine, and an engine torque regulator comprising, a reversible hydraulic motor operatively connected with said fuel control, a valve for controlling said motor, means actuated by fluid pressure in said fluid containing means for moving said valve, resilient means opposing movements of said valve by said fluid pressure, and manually controllable means for varying the force exerted on said valve by said resilient means to vary the torque value at which said valve operates to reverse said motor.

7. In combination with an engine having a fuel control for regulating engine power, a hydraulic torque indicator in which the pressure of the hydraulic fluid varies directly with the torque developed by said engine, and an engine torque regulator comprising, a reversible hydraulic motor operatively connected with said fuel control, a valve for controlling said motor, means actuated by the fluid pressure in said torque indicator for moving said valve, resilient means opposing movement of said valve by said fluid pressure, and manually controllable means for varying the force exerted on said valve by said resilient means to vary the torque value at which said valve operates to reverse said motor.

8. In combination with an engine having a fuel control for regulating engine power, a hydraulic torque indicator in which the pressure of the hydraulic fluid varies directly with the torque developed by said engine, and an engine torque regulator comprising, a reversible hydraulic motor supplied with hydraulic fluid under pressure from said torque indicator and operatively connected with said fuel control, a valve for controlling the supply of hydraulic fluid to said motor operative to reverse said motor and move from one side to the other of its neutral positions, means actuated by the pressure of said hydraulic fluid for moving said valve, resilient means opposing movement of said valve, and manually controllable means for varying the force exerted on said valve by said resilient means to vary the torque value at which said valve operates to reverse said motor.

9. In combination with an engine having a fuel control for regulating engine power, fluid containing means in which the fluid pressure varies directly with the torque developed by said engine, and an engine torque regulator comprising, a reversible hydraulic motor operatively connected with said fuel control, a valve operative when moved from one side to the other of its neutral position to reverse said motor, means actuated by fluid pressure in said fluid containing means for moving said valve, resilient means opposing movement of said valve by said fluid pressure, manually controllable means for varying the force exerted on said valve by said resilient means to vary the torque value at which said valve operates to reverse said motor, and a valve disposed between said motor and said motor controlling valve operative when the fluid pressure in said fluid containing means reaches a value consistent with a predetermined maximum allowable torque value to render said motor controlling valve inoperative and control said motor to reduce the torque developed by said engine.

10. In combination with an engine having a throttle and a manual control therefor, a hydraulic torque indicator in which the pressure of the hydraulic fluid varies directly with the torque developed by said engine, and an engine torque regulator comprising, a reversible hydraulic motor operatively connected with said throttle, a valve for controlling said motor, means actuated by the pressure of said hydraulic fluid for moving said valve, resilient means opposing movement of said valve by said fluid pressure, and manually controllable means for varying the force exerted on said valve by said resilient means, and a manually operable valve disposed between said motor and said motor controlling valve operative to render said motor valve ineffective and to hydraulically connect both sides of said hydraulic motor to disable said motor and relegate the control of said engine to said manual throttle control.

11. In combination with an engine having a fuel control for regulating engine power, fluid containing means in which the fluid pressure varies directly with the torque developed by said engine, and an engine torque regulator comprising, a reversible hydraulic motor operatively connected with said fuel control, a valve for controlling said motor, means actuated by fluid pressure in said fluid containing means for moving said valve, resilient means opposing movements of said valve by said fluid pressure, and manually controllable means for varying the force exerted on said valve by said resilient means to vary the torque value at which said valve operates to reverse said motor, a valve disposed between said motor and said motor controlling valve operative to disable said torque regulator, a manual control for said valve, a manual control for said engine fuel control, and a connection between said manual controls effective to automatically disable said torque regulator whenever said manual fuel control is moved to engine idling position.

12. In combination with an engine having a fuel control for regulating engine power, fluid containing means in which the fluid pressure varies directly with the torque developed by said engine, and an engine torque regulator comprising, a reversible hydraulic motor operatively connected with said fuel control, a valve for controlling said motor, means actuated by fluid pressure in said fluid containing means for moving said valve, resilient means opposing movements of said valve by said fluid pressure, and manually controllable means for varying the force exerted on said valve by said resilient means to vary the torque value at which said valve operates to reverse said motor, and means for limiting the maximum torque output of said engine comprising, a valve operative to control said motor to reduce the engine torque output, a piston subject to said fluid pressure to move said valve to its torque reducing position, a spring opposing movement of said valve, and an adjustable abutment for said spring.

13. In combination with an engine having a throttle for regulating engine power, a hydraulic torque indicator in which the pressure of hydraulic fluid varies directly with the torque developed by said engine, and an engine torque regulator comprising a reversible hydraulic motor operatively connected with said throttle, a valve for controlling said motor operative when moved from one side to the other of its neutral position to reverse said motor, means actuated by said hydraulic fluid for moving said valve, resilient means opposing movement of said valve by said hydraulic fluid, manually controllable means for varying the force exerted on said valve by said resilient means to vary the torque value at which said valve operates to reverse said motor, a valve disposed between said motor and said motor controlling valve operative to disable said motor controlling valve and control said motor to operate said throttle in a direction to reduce the torque output of said engine, means actuated by said hydraulic fluid when the pressure of said fluid reaches a value consistent with maximum permissible torque to move said valve to torque reducing position, a spring opposing movement of said valve by said fluid actuated means, and an adjustable abutment for said spring for selecting the maximum permissible torque output of said engine.

14. In combination with an engine having a throttle for regulating engine power, a hydraulic torque indicator in which the pressure of hydraulic fluid varies directly with the torque developed by said engine, and an engine torque regulator comprising a reversible hydraulic motor operatively connected with said throttle, a valve for controlling said motor operative when moved from one side to the other of its neutral position to reverse said motor, means actuated by said hydraulic fluid for moving said valve, resilient means opposing movement of said valve by said hydraulic fluid, manually controllable means for varying the force exerted on said valve by said resilient means to vary the torque value at which said valve operates to reverse said motor, a valve disposed between said motor and said motor controlling valve operative to disable said motor controlling valve and control said motor to operate said throttle in a direction to reduce the torque output of said engine, means actuated by said hydraulic fluid when the pressure of said fluid reaches a value consistent with maximum permissible torque to move said valve to torque reducing position, a spring opposing movement of said valve by said fluid actuated means, and an adjustable abutment for said spring for selecting the maximum permissible torque output of said engine, and a valve disposed between said motor and said motor controlling valve operative to hydraulically connect the opposite sides of said motor to render said torque regulating means inoperative and relieve any force exerted by said torque regulating means on said throttle, and a manual control for said disabling valve.

ALBERT LEWIS MacCLAIN.